UNITED STATES PATENT OFFICE 2,588,338

TREATMENT OF FISH LIVERS

Frantz Aimé Vandenheuvel, Halifax, Nova Scotia, Canada, assignor to Canadian Patents and Development Limited, Ottawa, Ontario, Canada, a corporation of Canada No Drawing. Application August 13, 1949, Serial No. 110,240

6 Claims. (Cl. 260—412.1)

This invention relates to the treatment of fish livers and more particularly to the separation and recovery of oil and substantially undenatured protein from fish livers.

In the past, several methods have been developed for extracting oil from fish livers none of which have been adequate, simple and inexpensive for the separation of the major components of the livers. The known processes are costly, complicated, use expensive solvents or reagents and in general provide for the recovery of only one component of the livers, namely the oil, the protein portion being denatured due to excess alkali, water and heat and other additional materials. It is well known that temperatures above 70° C. in the presence of high alkalinity cause complete dissolution of the protein cellular substance of fish livers. While such dissolution frees the oil it also denatures the protein material.

It is the object of this invention to provide a simple, efficient and inexpensive process for the complete separation of the major components of fish livers in a substantially unaltered condition by forming an oil phase and a protein-water phase.

Another object of the invention is to provide a method of separating and recovering the major components of fish livers which, while disposing the oil and protein in two separable phases, leaves the protein in its substantially natural condition, thus providing two useful edible products.

A still further object is to provide a convenient method which may be operated continuously or in batches.

It has been found that if finely crushed fish livers are heated to between 45° C. and 70° C. and treated with a small amount of alkali to adjust the pH of the mass to between 7.5 and less than 8.5 a high percentage of the major components may be recovered. The process is applicable to the livers of cod fish, halibut, dogfish, tuna fish, etc. The highest percentage of oil is found in dogfish liver and amounts to about 70% of the weight of the liver. Cod fish livers contain from 40–65% oil, and halibut and tuna fish livers possess less than 20% oil.

In accordance with this invention the fish livers, which when fresh have a pH of about 6.2 to 6.8 and which are composed of oil and proteins with the oil in the form of globules surrounded by water and protein cell tissue, are crushed or macerated by any suitable means, preferably by a hammer-mill, to a fine state. The disintegrated livers form a homogeneous pasty mass comprising a great deal of oil liberated from broken cells and distributed throughout the mass as tiny droplets. The finer the livers are crushed the more oil is liberated. The tiny droplets are surrounded by a film of cellular fluid containing protein and water, the protein being the cell wall debris from the broken cells and the cellular fluid aqueous solution previously contained between the cell walls of the oil globules.

The pasty material is heated to a temperature of more than 45° C. but not in excess of 70° C. After heating, the pH is adjusted to between 7.5 and less than 8.5 by adding an alkali. The alkalinity is adjusted to achieve maximum swelling or sufficient absorption of the water by the protein to cause at a specific temperature rupture of the protein-water film surrounding the oil globule. The preferred pH is about 8. A pH of 8.5 or greater leads to denaturation of the protein and formation of emulsions.

After the liver is disintegrated, heated and treated with the required amount of alkali the warmed liver is permitted to cool. Upon cooling to a specific temperature rupture of the protein-water film occurs and a substantially complete separation of the oil and protein-water components takes place rapidly. This separation is practically instantaneous when a critical temperature is reached following treatment of disintegrated liver with alkali. The specific temperature at which rupture of the protein-water structure occurs depends on the nature of the protein present and on the oil content of the liver. The higher the oil content, the lower is the critical temperature. Such a temperature may be as low as about 45° but does not exceed 70° C.

The oil phase separation from the protein-water components is completed by known methods such as, settling, floating or centrifuging. The time for the reagent to act is less than thirty seconds and from the beginning of the maceration of the livers to the end of separation of its components the time is less than three minutes. Hence the process may be made continuous.

In the above described process the liver is macerated, heated, then treated with an alkali, cooled to separate the oil and protein-water and then centrifuged. The liver may be macerated and then treated with an alkali before it is heated above 45° C. In such process when heating from below 45° C. separation of oil from protein-water occurs whenever the critical temperature is reached. This second procedure is not as efficient as that first mentioned since the percentage of oil separated is not as great, owing to inability of the alkali to distribute and react readily at low temperatures.

The concentration and amount of alkali solution added are important. Solid alkali may be used but since in this form it is difficult to mix with the comminuted livers it is preferable to add the alkali in the form of an aqueous solution. A solution of alkali as low as 10% is not as effective as higher concentration since the yield of oil recovered varies with the concentration of the alkali in the macerated livers. A commercially produced solution of caustic soda containing about 26–27% alkali is quite satisfactory. More concentrated solutions may be used if available. Alkalies or alkaline reagents which may be used and which are effective in substantially chemically equivalent amounts are calcium hydroxide, caustic potash, caustic soda, sodium carbonate or bi- and tri-sodium phosphate or mixtures of caustics with the mentioned salts. Corresponding compounds of lithium and caesium can be used and also other substances providing sufficient alkalinity. Caustic potash and caustic soda are preferred. The amount of alkali added should not exceed approximately 1.5% and is preferably less than 1%. The alkali added is of an amount proportionate to the weight of the macerated liver and sufficient only to cause maximum swelling of the protein and rupturing of the protein structure surrounding the oil globules. An excess amount of alkali causes a denaturation of the protein. With cod or dogfish livers no more than 1% alkali is required while with halibut livers up to 1.5% can be used. The preferred amount of alkali for the treatment of cold liver is 0.5 to 0.7% of the weight of the livers.

The amount of water added with the alkali varies with the amount of natural water of the livers but should not exceed 7 or 8% of the weight of the livers and is preferably kept below 3%. The hydrophylic property of alkali treated protein is limited and any amount of water added above the maximum capacity of the protein to absorb is harmful in that emulsion of oil results with consequent reduction in yields. The protein acts as a natural buffer and with increase in the amount of water there is a decrease in this buffer property. The efficiency of the process depends on the protein absorbing substantially all of the water both natural and added and on its capacity as a buffer.

Ammonium hydroxide is not a satisfactory alkali since the amount required to adjust the pH of the mass adds more water than can be absorbed by the protein. Furthermore the ammonia salts formed impair the edible properties of the oil and protein.

In the treatment of livers low in oil there may be added a vegetable or fish liver oil, to the material after or before alkali and heat treatment. Separation may then be completed. An example would be the addition of cod oil or vegetable oil to halibut liver.

In the foregoing procedure a very small percentage of oil, usually less than 5% remains in the protein-water phase. This may be recovered by remixing the separated protein-water phase with any amount of another oil and recentrifuging. Such a step is important for the treatment of high potency livers such as halibut livers in which some small amount of vitamin A is possibly retained absorbed in the protein. A low potency oil or even vegetable oil is used for the purpose and in this way brought up to a much higher potency. 95% to 99% extraction of the vitamin (vitamin A) in halibut livers has been extracted in this way. The vitamin not extracted in the oil is recovered in the undenatured protein. Both protein product and oil are of excellent food quality and when recovered from some kinds of fish livers have a strikingly superior quality.

The protein-water phase obtained by this process is treated with an acid to bring it to the required pH. Drying of the paste produces a clear, yellow solid of pleasant smell and taste and contains a high value in thiamin, riboflavin, vitamin B anti-anaemia factors and assimilable forms of various minerals. Acids used in this treatment may be hydrochloric, phosphoric, or acetic. The protein may be defatted completely by solvent extraction in known ways and then loses all taste and flavour. After neutralization the paste can be blended with flavours or spices and canned or incorporated in other food products or can be dried for other uses.

The following examples are intended to be illustrative only:

*Example I*

180 kgs. of spring caught cod livers were disintegrated to a fine state and then warmed to a temperature of 60° C. 2.0 liters of 20% aqueous solution of caustic potash were added to the disintegrated liver whilst stirring. This gave a pH of 8.2. The material was cooled to 50° C. at which separation of the oil phase and protein-water phase occurred and it was then run through a centrifuge. 98% of the oil originally in the liver was separated. The oil, when washed with water, and again centrifuged, gave a clear oil of pleasant smell and taste and contained an exceptionally high vitamin A content: 8700 i. u. per gm.

*Example II*

198 kgs. of fall caught Atlantic Coast cod livers (*Gadus monhua*) containing 57.8% oil were disintegrated to a fine state and then warmed to a temperature of 55° C. 1.7 liters of 28% sodium hydroxide solution were added to the disintegrated liver whilst stirring, giving a pH of 8.3. Separation of the oil phase and protein water phase occurred immediately and it was then run through a centrifuge. 96% of the oil originally in the liver was separated. Vitamin A content: 5000 i. u. per gm.

To the 88 kgs. of resulting protein-water phase having a pH of 8.3 was added hydrochloric acid to adjust the pH to 6.1. The paste produced was dried on a drum drier. Weight of this material dried was 29.7 kgs. and comprised 4.5 kg. of oil and other extractable material. After removal of oil from the dry matter there was obtained 25 kg. of protein.

*Example III*

180 kgs. of fall caught Atlantic Coast dogfish livers (*Squalus acanthias*) were disintegrated to a fine state and then warmed to a temperature of 50° C. 1.4 liters of 28% sodium hydroxide solution were added to the disintegrated liver whilst stirring, giving a pH of 8.1. The material was further warmed to a temperature of 52° C. at which phase separation of the oil phase and the protein-water phase occurred and it was then run through a centrifuge. 97% of the oil originally in the liver was separated. Vitamin A content: 5370 i. u. per gm.

*Example IV*

180 kgs. of Atlantic halibut livers (*Hippoglos-* sus) were distintegrated to a fine state and then warmed to a temperature of 60° C. 4 liters of 28% sodium hydroxide solution were added to the distintegrated liver whilst stirring, giving a pH of 7.7. The material was further warmed to a temperature of 68° C. at which phase separation of the oil phase and protein-water phase occurred and it was then run through a centrifuge. 83% of the oil originally in the liver was separated. Vitamin A content: 76,650 i. u. per gm.

The resulting protein-water phase having a pH of 7.7 was mixed at room temperature with 40 kg. of cod liver oil (vitamin A content: 3,200 i. u. per gm.) and the whole recentrifuged. 42 kgs. of oil were obtained having a vitamin A content: 14,500 i. u. per gm.

The latter residue mixed with a second 40 kgs. of cod liver oil (vitamin A content: 3,200 i. u. per gm.) and then centrifuged yielded 40 kgs. of cod liver oil having a vitamin A content: 7,800 i. u. per gm.

The word "protein" as used in this specification and in the appended claims means the macerated or comminuted fish liver in the form of liver paste residue from the oil extraction and contains actual protein, water, and small amounts of vitamins, organo-metallic compounds, glucosides and residual amounts of oil.

The terms "denatured" and "undenatured" as used in this specification and in the appended claims are applicable chiefly to the protein part of the fish livers. The term "denatured" is intended to mean a changed chemical content or composition of the actual protein of the original liver. It is also intended to mean changed vitamin B complexes of such protein.

I claim:

1. A method of recovering oil and undenatured protein from fish livers which comprises macerating the livers, adjusting the temperature of the macerated mass to between 45 and 70° C., adjusting the pH of the mass to between 7.5 and less than 8.5 with an aqueous solution of an alkali containing not more than 1.5% of the weight of the liver of the alkali and less than 8% of the weight of the liver of water to obtain maximum hydration of the protein to liberate oil and protein from each other, said mass being maintained throughout the treatment free from other additions, at a temperature not exceeding 70° C. and at a pH less than 8.5 to avoid denaturing of the protein therein, and separating the oil phase from the undenatured protein-water phase.

2. A method as defined in claim 1 wherein the pH of the mass is adjusted to substantially 8.0.

3. A method as defined in claim 1 wherein the pH of the mass is adjusted before adjusting the temperature.

4. A method as defined in claim 1 wherein the aqueous solution for adjusting the pH contains less than 1% of the weight of the livers of the alkali.

5. A method as defined in claim 1 wherein the aqueous solution for adjusting the pH contains about 3% of the weight of livers of water.

6. A method as defined in claim 1 wherein the alkali is caustic soda.

FRANTZ AIMÉ VANDENHEUVEL.

REFERENCES CITED

The following references are of record in the file of this patent:

UNITED STATES PATENTS

| Number | Name | Date |
| --- | --- | --- |
| 2,136,481 | Young et al. | Nov. 15, 1938 |
| 2,156,985 | Hempel | May 2, 1939 |
| 2,238,059 | Jones | Apr. 15, 1941 |
| 2,240,232 | Taylor et al. | Apr. 29, 1941 |
| 2,303,740 | Hempel | Dec. 1, 1942 |
| 2,325,367 | Buxton et al. | July 27, 1943 |
| 2,345,099 | Buxton | Mar. 28, 1944 |